United States Patent
Johnson

(10) Patent No.: US 8,412,451 B2
(45) Date of Patent: Apr. 2, 2013

(54) TELEMETRY-BASED REGENERATION STRATEGY FOR AN ENGINE EXHAUST AFTER-TREATMENT DEVICE

(75) Inventor: Randall L. Johnson, Monee, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 757 days.

(21) Appl. No.: 12/579,643

(22) Filed: Oct. 15, 2009

(65) Prior Publication Data

US 2011/0088374 A1    Apr. 21, 2011

(51) Int. Cl.
*F01N 11/00* (2006.01)
(52) U.S. Cl. .............................. 701/400; 123/321
(58) Field of Classification Search .................. 701/400, 701/100, 108; 60/272–274, 295, 285, 287–293, 60/303, 311; 123/321–322
See application file for complete search history.

(56) References Cited

U.S. PATENT DOCUMENTS

| | | | |
|---|---|---|---|
| 6,216,676 B1 * | 4/2001 | Gotoh et al. | 123/568.21 |
| 6,845,314 B2 * | 1/2005 | Fosseen | 701/114 |
| 7,028,793 B2 * | 4/2006 | Hu et al. | 180/65.25 |
| 8,015,805 B2 * | 9/2011 | Pfaeffle et al. | 60/295 |
| 2011/0283682 A1 * | 11/2011 | Gallagher et al. | 60/274 |

* cited by examiner

*Primary Examiner* — Dalena Tran
(74) *Attorney, Agent, or Firm* — Mark C. Bach; Jeffery P. Calfa

(57) ABSTRACT

A method for timing performance of a maintenance function, in particular the timing of regeneration of a diesel particulate filter (22) to conserve fuel as a motor vehicle (10) travels along a projected travel route. Certain road data about roads in a roadway system is processed to develop data for anticipating certain modes of vehicle operation during travel of the vehicle along the projected travel route. The data for anticipating certain modes of vehicle operation along the anticipated route of travel and data geographically tracking vehicle travel along the projected route are interactively used to control timing of performance of the maintenance function as the vehicle travels along the projected route.

2 Claims, 2 Drawing Sheets

TELEMETRY-BASED REGENERATION STRATEGY FOR AN ENGINE EXHAUST AFTER-TREATMENT DEVICE

FIELD OF THE DISCLOSURE

This disclosure relates generally to systems and strategies for controlling tailpipe emissions from motor vehicles, such as trucks, that are powered by internal combustion engines, especially diesel engines whose exhaust systems have certain exhaust gas treatment devices, such as diesel particulate filters (DPF's), that from time to time are regenerated.

BACKGROUND OF THE DISCLOSURE

A known after-treatment system for exhaust gas passing through an exhaust system of a diesel engine comprises a diesel oxidation catalyst (DOC) associated with a diesel particulate filter (DPF). The combination of these two exhaust gas treatment devices promotes chemical reactions in exhaust gas and traps diesel particulate matter (DPM) as exhaust flows through the exhaust system, thereby preventing significant amounts of pollutants such as hydrocarbons, carbon monoxide, soot, SOF (soluble organic fraction), and ash, from entering the atmosphere.

A DPF is regenerated from time to time in order to maintain particulate trapping efficiency. Regeneration involves creating conditions that will burn off trapped particulates whose unchecked accumulation would otherwise impair DPF effectiveness and/or engine performance.

At times a vehicle may be operating in a way that inherently burns off trapped materials in a DPF. This naturally occurring regeneration is sometimes called "passive" regeneration. Passive regeneration generally has little or no significant effect on either fuel economy or vehicle driveability.

When trapped materials accumulate in a DPF faster than they are passively removed, they eventually reach a level, often expressed as a percentage, that calls for the DPF to be regenerated. A regeneration initiation and control strategy in the engine controller forces regeneration. Such a forced regeneration is sometimes referred to as "active" regeneration.

A typical regeneration initiation and control strategy controls air and fuel management systems in a manner that elevates engine exhaust gas temperature to one that is high enough to burn off trapped DPM. One way to elevate exhaust gas temperature is by post-injection of fuel.

Active regeneration is less efficient than passive regeneration because extra fuel is used to elevate the exhaust gas temperature. Apart from causing some reduction in vehicle fuel economy, active regeneration may also have an effect on vehicle drivability that if significant enough, should be addressed to assure customer satisfaction.

SUMMARY OF THE DISCLOSURE

The present disclosure describes a regeneration initiation and control system and strategy for a DPF that interactively processes certain data, including telemetric data that enables the geographical location of the vehicle to be determined and data about certain characteristics of either a planned, or projected, travel route along roads of a roadway system for timing the initiation of active regeneration to coincide with vehicle travel along a segment of the route that would be expected to result in the use of less extra fuel for regeneration than would be expected to be used when the vehicle is traveling along a different segment of the route.

The disclosed system and strategy can postpone the time at which active regeneration would otherwise commence, or advance the time at which active regeneration would otherwise commence, or do neither.

If, upon issuance of a regeneration request occurring when soot accumulation in the DPF has increased to some given percentage, a more distant ensuing segment of a travel route contains roads along which regeneration of the DPF would be expected to use less extra fuel than along a less distant ensuing segment because of diversity between certain physical characteristics of the respective road segments and/or because of certain restrictions on how vehicles can lawfully operate on the respective road segments, then regeneration can be postponed. The intent of such a postponement is to allow the vehicle to reach and begin traveling along the more distant segment with the expectation that a net savings in the extra fuel that would be used for regeneration can be realized, or the possibility that passive regeneration might occur and delay active regeneration even more. However, the consequence of any delay that could potentially impact compliance with applicable tailpipe emission requirements or potentially damage equipment in the vehicle should be considered before permitting the delay, and if the soot accumulation in the DPF increases by some amount beyond the aforementioned percentage, then regeneration is initiated.

If, upon issuance of a regeneration request occurring when soot accumulation in the DPF has increased to some given percentage, a more distant ensuing segment of a travel route contains roads along which regeneration of the DPF is expected to use more extra fuel than along a less distant ensuing segment because of diversity between certain physical characteristics of the respective segments and/or because of certain restrictions on how vehicles can lawfully operate on the respective segments, then regeneration can be allowed to commence without delay, the intent still being the expectation of realizing a net savings in the extra fuel that would be used for active regeneration.

If the level of trapped DPM in the DPF is insufficient to request active regeneration while the vehicle is traveling along a segment of a travel route before intending to stop, but if the distance to the stopping point and road conditions along the way are expected to initiate active regeneration before the vehicle arrives at the stopping point and the resulting regeneration may not be complete by the time the vehicle arrives there, then the disclosed system and strategy can initiate active regeneration early enough to expect complete regeneration by the time the vehicle does stop.

One general aspect of this disclosure relates to a vehicle comprising an engine for propelling the vehicle comprising an exhaust system through which exhaust gases created by combustion in engine cylinders pass to atmosphere and which comprises an after-treatment device that treats the exhaust gases before leaving the exhaust system but that at times is regenerated by elevation of temperature of the exhaust gases to a regeneration temperature range, a telematic system providing geographical data tracking travel of the vehicle along roads in a roadway system, a database containing an electronic map of the roadway system that includes road data about roads in the roadway system useful in anticipating certain modes of engine operation during travel of the vehicle along roads in the roadway system, and an engine controller for initiating, controlling, and terminating regeneration of the after-treatment device.

The after-treatment device comprises an operating strategy that interactively uses both road data from the database to anticipate modes of engine operation along an anticipated route of travel of the vehicle over roads in the roadway system and geographic tracking data from the telematic system to time initiation of regeneration of the after-treatment device.

Another general aspect relates to a strategy for timing regeneration of an after-treatment device in an exhaust system of an engine in a motor vehicle for propelling the vehicle along a projected route of travel over roads in a roadway system.

The strategy comprises geographically tracking the location of the vehicle as it travels along roads in the roadway system, processing certain road data about roads along the projected route of travel useful in anticipating certain engine operating data along the projected route to develop certain anticipated engine operating data along the projected route, and using the anticipated engine operating data to time initiation of regeneration of the after-treatment device as the vehicle travels along the projected route.

The disclosure in perhaps more general aspects relates both to a motor vehicle comprising a telematic system providing geographical data tracking travel of the vehicle along roads in a roadway system, and a controller for controlling timing of performance of a maintenance function for a device in the vehicle and comprising an operating strategy for interactively using certain road data about roads in the roadway system to anticipate certain modes of vehicle operation during travel of the vehicle along a projected route of travel along the roadway system and geographical tracking data tracking vehicle travel along the projected route to time performance of the maintenance function as the vehicle travels along the projected route, and also to a method for timing performance of such a maintenance function.

The method comprises processing certain road data about roads in the roadway system to develop data for anticipating certain modes of vehicle operation during travel of the vehicle along the projected travel route, and interactively using the data for anticipating certain modes of vehicle operation along the anticipated route of travel and data geographically tracking vehicle travel along the projected route to control timing of performance of the maintenance function as the vehicle travels along the projected route.

The foregoing summary, accompanied by further detail of the disclosure, will be presented in the Detailed Description below with reference to the following drawings that are part of this disclosure.

DETAILED DESCRIPTION

Figure 1:
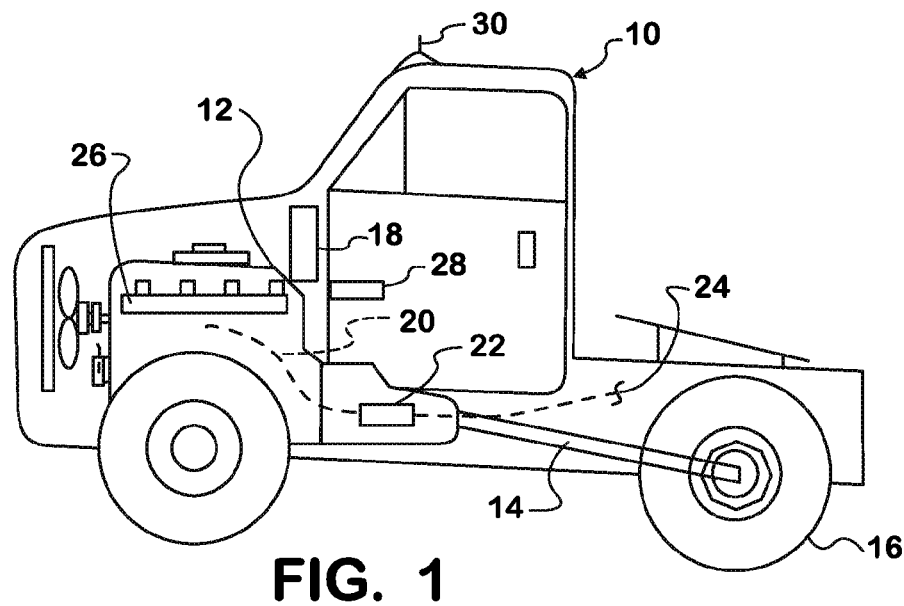
FIG. 1 shows portions of a truck relevant to the present disclosure.

FIG. 1 shows a truck 10 that is propelled by a diesel engine 12 that is coupled by a drivetrain 14 to driven wheels 16. The example shown represents a highway tractor for hauling a trailer, or tandem trailers, coupled to the tractor's fifth wheel.

Truck 10 has an electronic data system that includes various electronic modules for processing various data to control various systems and devices. One such module is an engine controller 18 that has one or more processors processing data from various sources to develop various data that is used for informational and/or control purposes. The data that is processed may originate at external sources and/or be generated internally.

Engine 12 also has an exhaust system 20 through which exhaust gases created by combustion of combustible mixtures in combustion chambers of engine 12 are exhausted to the surrounding atmosphere. Exhaust system 20 comprises one or more after-treatment devices, one of which is a diesel particulate filter (DPF) 22 that traps diesel particulate matter (DPM) so that such matter does not pass through to tail pipe 24 and into the surrounding atmosphere.

The combustion chambers of engine 12 comprise cylinders into which fuel is injected by fuel injectors of a fueling system 26 to combust with charge air that has entered through an intake system. Energy released by combustion powers the engine via pistons connected to a crankshaft leading to drivetrain 14 for propelling the vehicle.

The fuel injectors are under the control of controller 18, typically through injector drivers, to force fuel out of the injector tips into the combustion chambers. Intake valves control the admission of charge air into the cylinders, and exhaust valves control the outflow of combustion gases through exhaust system 20 and ultimately to atmosphere.

As explained earlier, DPF 22 is regenerated from time to time in order to burn off trapped DPM. When a regeneration request issues because of disclosure that the percentage of trapped soot has reached a level at which regeneration would be appropriate, engine controller 18 can initiate and control regeneration, such as by changing fueling and/or air management, to suitably condition the exhaust gases so that they can become effective to burn off the trapped DPM.

The percentage of trapped soot in DPF 22 can be determined in any suitably appropriate way, such as by measuring the pressure/flow characteristic of the DPF. Actual initiation of regeneration may also be conditioned on certain other conditions being favorable.

Truck 10 is equipped with a telematic system 28 embodying wireless technology and GPS tracking technology for enabling data to be exchanged between the truck and a location remote from the truck and for enabling the truck's geographical location to be determined using the Global Positioning System.

Telematic system 28 communicates wirelessly through an antenna system 30 with one or more satellites of the Global Positioning System and bi-directionally with a nearby tower of a cellular communications system. The cellular communications system has bi-directional communication with a land-based station remote from the truck. Module 28 can also communicate with other devices and modules in the truck's electronic data system via a data bus or busses in the truck.

As truck 10 travels along roads of a roadway system, its ability to receive and process data from the Global Positioning System provides the truck's data system with geographical data tracking its location. That data can also be transmitted to the land-based station.

The execution of the disclosed strategy is performed by engine controller 18 with the interactive use of telemetric system 28. An electronic map of a roadway system on which vehicles can travel and certain data about roads in the roadway system are contained in telematic system 28. The map and road data can be permanently stored in system 28 or alternately loaded into the system via wireless communication from a remote station having a database containing the data. The data about roads in the roadway system provides information useful in anticipating how engine 12 would be expected to operate as it propels truck 10 along roads in the roadway system.

Figure 2:
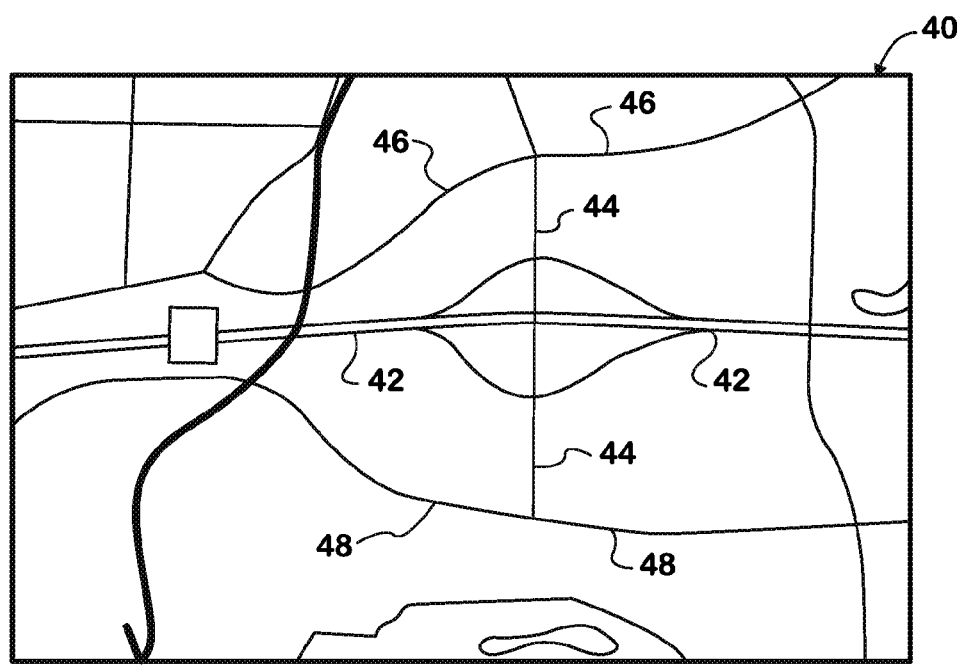
FIG. 2 is a geographical map useful in explaining some aspects of the disclosure.

An example of a map 40 is portrayed visually in FIG. 2. Map 40 contains various roads along which vehicles can travel. One is a multi-lane expressway 42 having entrance and exit ramps to and from a highway 44 having a bridge that crosses over the expressway. Other roads 46, 48 intersect road 44.

The data about the roads may comprise, for example, legal speed limit data, traffic control device data, road intersection data, and/or road grade data.

A projected route of travel for truck 10 can be established either at the land-based station or on-board the truck. The projected route can be mapped either by a person using certain available information about a roadway system or by a route-planning algorithm having access to a database having a map of the roads and certain information about them.

Once a route has been projected, data about roads along the route is processed by an algorithm that analyzes the data to anticipate how a vehicle may be operated as it travels along various sections of the route. The analysis yields anticipated vehicle operating data, including engine speed and load data anticipated to occur along those various sections. That data can then be used to distinguish sections of the route along which the truck would use less extra fuel for active regeneration of the DPF from sections along which the truck would use more extra fuel for active regeneration. For example a section that is free of traffic control devices and intersections and/or has a high legal speed limit (expressway 42 for example) can be distinguished from a section that has frequent traffic control devices, frequent intersections, and a low legal speed limit. Data about the presence or absence of significant uphill and/or downhill grades is also useful. The work used in climbing a significant uphill grade will elevate exhaust temperature, promoting regeneration, while descending a downhill grade reduces engine load, and consequently exhaust temperature as well.

As truck 10 travels along the projected route, the GPS tracking that enables the truck's location along the route to be determined and anticipated engine speed/load data resulting from the analysis of the route explained above are processed to allow a regeneration request to initiate an active regeneration, or to postpone an active regeneration that has been requested, or to initiate an active regeneration earlier than it would otherwise likely occur.

Figure 3:
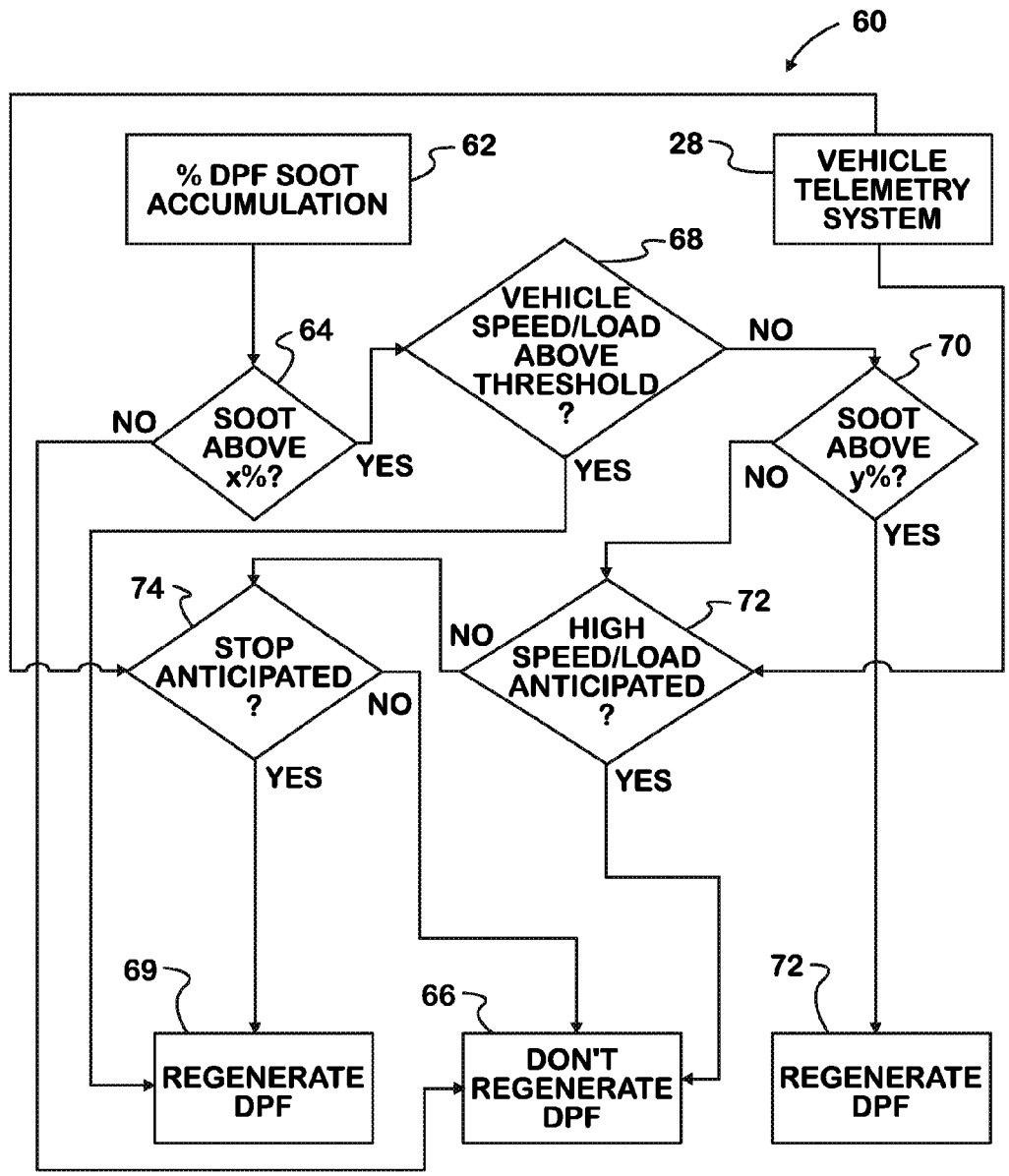
FIG. 3 is a strategy diagram useful in explaining the disclosure.

Data that discloses trapped DPM present in DPF 22 is available on a data bus or busses in truck 10, as is data that represents the truck's geographical location determined by telemetric system 28. Data for trapped DPM, data for truck location, and data about expected engine speeds/loads along different sections of the travel route are processed by engine controller 18. An example of a flow diagram 60 of the processing is disclosed in FIG. 3.

Trapped DPM data, i.e. % DPF soot accumulation 62, is evaluated by a step 64 for the purpose of determining whether or not the accumulated soot exceeds some amount, x %, above which an active regeneration request will issue. If x % is not exceeded, then regeneration is not initiated (reference numeral 66). If x % is exceeded, then a step 68 is performed.

Step 68 evaluates current engine speed/load data to ascertain whether or not the data lies in a zone of a speed/load plot within which the regeneration request should be allowed to initiate active regeneration, provided that other applicable conditions, if any, are also satisfied.

If the data is disclosed not to lie in such a zone, then a step 70 is performed for the purpose of determining whether or not the accumulated soot exceeds some amount y % which exceeds x % by some amount. If y % is exceeded, then active regeneration is initiated as shown by a step 72. A value for x % represents a particular amount of accumulated soot at which it is considered worthwhile to perform regeneration, as distinguished from the greater value for y % that has been determined to represent an amount of accumulated soot at which regeneration will be forced.

If step 68 instead discloses that the current engine speed/load data does lie in such a zone, then active regeneration is initiated (step 69), subject to other conditions, if any, that also have to be satisfied.

If step 70 determines that the accumulated soot doesn't exceed y %, the engine load/speed data projected to occur during vehicle travel along an ensuing segment of the route as a result of the analysis described earlier and the current location of the truck along the projected route, as determined by telemetric system 28, are processed (step 72) to determine if future travel along a more distant segment would or would not use more extra fuel for active regeneration than would be used during future travel along a less distant segment of the route.

If the processing discloses that less extra fuel would be used, then active regeneration is postponed (step 66) with the expectation that a net savings in the extra fuel that would be used can be realized by the postponement, or that passive regeneration might occur once travel along the more distant segment commences further delaying active regeneration. If the processing discloses that more extra fuel would be used, then a step 74 is performed.

Step 74 determines whether or not truck 10 is expected to stop at some point along the projected route before reaching the ensuing more distant segment of the route.

If it is not, then regeneration is delayed (step 66) in the expectation of affording the truck the opportunity to begin travel along the ensuing more distant segment of the route that may be more favorable for conserving extra fuel used for regeneration.

If the truck is expected to stop, then active regeneration is initiated (step 69).

In this way, if a period of low engine speed/load driving is expected, controller 18 will either preemptively regenerate DPF 22 or else delay regeneration depending on whether or not a stop is anticipated. A reason for performing regeneration before a stop is because it would be expected that the engine and exhaust would have warmed to typical operating temperatures as the truck was being driven along the prior portion of the route, whereas if regeneration is initiated after the truck has stopped and the engine and exhaust system have cooled, extra fuel is used to perform regeneration during the time that the engine and exhaust have not yet reached typical operating temperatures.

While processing has been described as occurring in truck 10, some processing could be performed remotely. For example, the database of road information could be at a remote site. The geographical location of the truck and its projected route could be wirelessly transmitted to the remote site for processing in conjunction with data from the database to develop data for projected engine speeds/loads during future travel of the truck along the projected route. That data could then be wirelessly transmitted to the truck for processing in conjunction with the on-board regeneration initiation and control strategy to make an appropriate determination as to whether timing of active regeneration should be postponed or allowed to proceed in response to a regeneration request or whether regeneration should neither be advanced nor postponed.

What is claimed is:
1. A vehicle comprising:
an engine for propelling the vehicle comprising an exhaust system through which exhaust gases created by combustion in engine cylinders pass to atmosphere and which comprises a particulate filter that traps soot in the exhaust gases before leaving the exhaust system but that at times is regenerated by elevation of temperature of the exhaust gases to a regeneration temperature range;

a telematic system providing geographical data tracking travel of the vehicle along roads in a roadway system;

a database containing an electronic map of the roadway system that includes road data about roads in the roadway system useful in anticipating certain modes of engine operation during travel of the vehicle along roads in the roadway system;

an engine controller for initiating, controlling, and terminating regeneration of the particulate filter and comprising an operating strategy that interactively uses both road data from the database to anticipate modes of engine operation along an anticipated route of travel of the vehicle over roads in the roadway system and geographical tracking data from the telematic system to time initiation of regeneration of the particulate filter, and that comprises an algorithm which, a) when soot accumulated in the particulate filter becomes greater than a first threshold, evaluates engine speed data and engine load data to ascertain if active regeneration should be initiated, b) when evaluation of engine speed data and engine load data discloses that active regeneration should not be initiated and soot accumulated in the particulate filter remains less than a second threshold which is greater than the first threshold, analyzes road data from the database and geographical tracking data from the telematic system to determine if future travel along a more distant segment of the anticipated route of travel of the vehicle would use more extra fuel for active regeneration than would be used during future travel along a less distant segment of the anticipated route of travel, c) when analysis of road data from the database and geographical tracking data from the telematic system discloses that less extra fuel would be used along the more distant segment of the anticipated route of travel, postpones initiation of active regeneration, d) when analysis of road data from the database and geographical tracking data from the telematic system discloses that more extra fuel would be used along the more distant segment of the anticipated route of travel, determines if the vehicle is expected to stop before reaching the more distant segment of the anticipated route of travel, and e) when it is determined that the vehicle is expected to stop before reaching the more distant segment of the anticipated route of travel, initiates regeneration of the particulate filter.

2. A strategy for timing initiation of regeneration of a particulate filter in an exhaust system of an engine in a motor vehicle for propelling the vehicle along an anticipated route of travel over roads in a roadway system, the strategy comprising:

geographically tracking the location of the vehicle as the vehicle travels along roads in the roadway system;

processing certain road data about roads along an anticipated route of travel of the vehicle useful in anticipating certain engine operating data along the anticipated route to develop certain anticipated engine operating data along the anticipated route; and using the certain anticipated engine operating data to time initiation of regeneration of the particulate filter as the vehicle travels along the anticipated route; and interactively using both the road data to anticipate modes of engine operation along the anticipated route and the geographical tracking of the vehicle to time initiation of regeneration of the particulate filter, by executing an algorithm which, a) when soot accumulated in the particulate filter becomes greater than a first threshold, evaluates engine speed data and engine load data to ascertain if active regeneration should be initiated, b) when evaluation of engine speed data and engine load data discloses that active regeneration should not be initiated and soot accumulated in the particulate filter remains less than a second threshold which is greater than the first threshold, analyzes certain road data and geographical tracking of the vehicle to determine if future travel along a more distant segment of the anticipated route would use more extra fuel for active regeneration than would be used during future travel along a less distant segment of the anticipated route, c) when analysis of certain road data and geographical tracking of the vehicle discloses that less extra fuel would be used along a more distant segment of the anticipated route, postpones initiation of active regeneration, d) when analysis of certain data and geographical tracking of the vehicle discloses that more extra fuel would be used along the more distant segment of the anticipated route, determines if the vehicle is expected to stop before reaching the more distant segment of the anticipated route, and e) when it is determined that the vehicle is expected to stop before reaching the more distant segment of the anticipated route, initiates regeneration of the particulate filter.

* * * * *